Patented Feb. 6, 1934

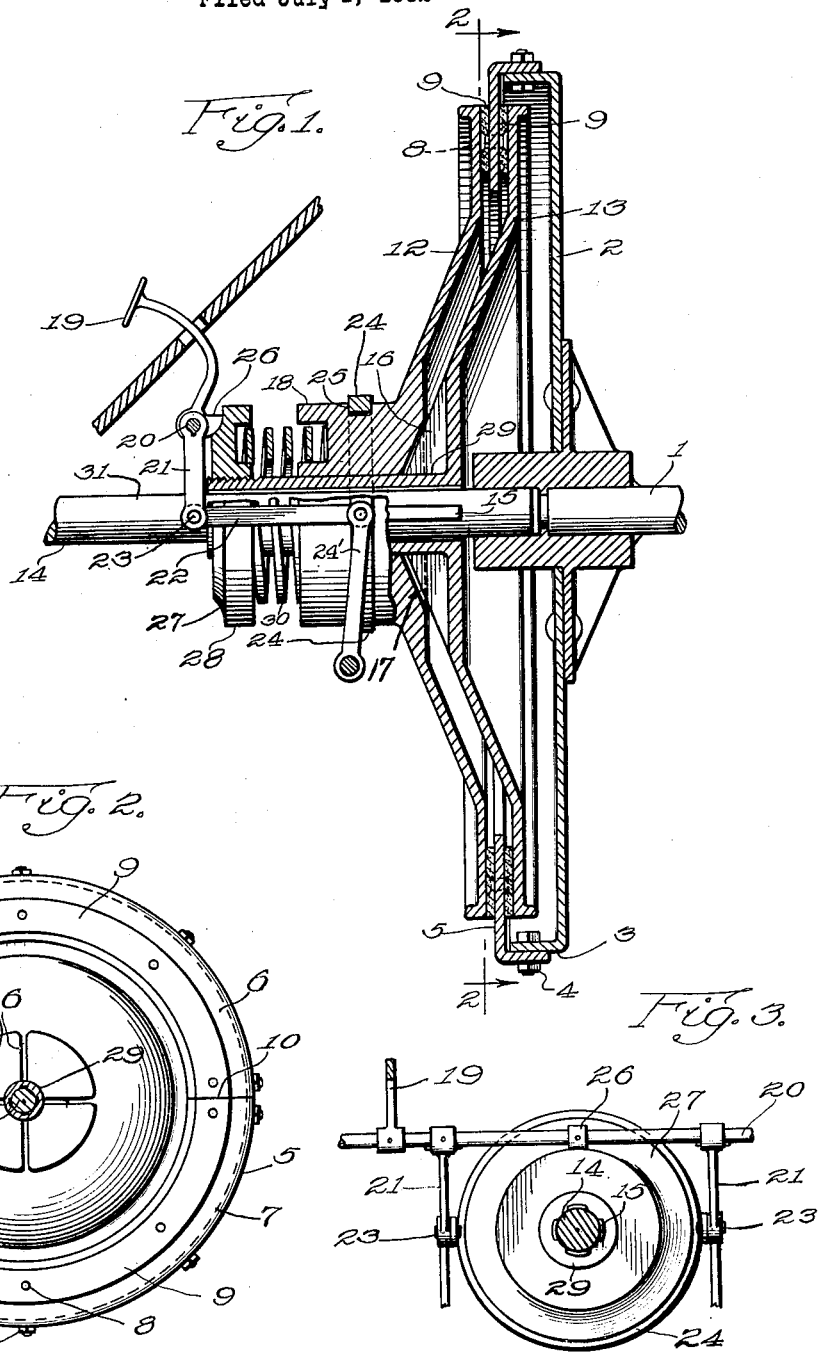

1,946,263

UNITED STATES PATENT OFFICE 1,946,263

FRICTION COUPLING

Julius H. Bach, Chicago, Ill.

Application July 1, 1932. Serial No. 620,442

1 Claim. (Cl. 192—68)

This invention relates to devices for preventing relative rotation between mechanical elements such as required in automobile clutches and brakes, and the objects of the invention are to provide structural improvements in disk brakes or clutches to enable the employment of braking surfaces of large area in a small dimensioned and compact durable structure, by the use of opposed and equalized forces against the surfaces of a ring shaped clutch or brake element, and the use of a brake element which carries the brake lining made in segments, allowing for the convenient and rapid replacement of such elements, or the removal thereof for relining purposes.

In the construction illustrated in the drawing:

Figure 1 is a longitudinal sectional view of the improved construction illustrated as a clutch.

Fig. 2 is a sectional view taken on the line 2—2 of Fig. 1, and illustrates the segmental form of a removable ring which carries the brake lining on opposite faces thereof, and is a reduction in size from the showing in Fig. 1.

Fig. 3 is a view taken from the left of Fig. 1, on a smaller scale than shown in Fig. 1, and with the clutch pedal partly broken away.

One of the principal features of this invention is the provision of a clutch or brake ring which is readily detachable from the rotatable member which carries it, and is formed of separable segmental brake or clutch lining carrying elements which may be readily removed from between cooperating pressure disks. The latter have opposed motions for engaging or disengaging the opposite surfaces of the relatively rotating ring-shaped lining carrying element.

Referring to Figs. 1, 2 and 3, which illustrate the construction as designed for an automobile clutch, the engine crank shaft 1 carries rigidly a fly wheel or other disk-shaped clutch ring supporting element 2. The member 2 is provided with an axially extending peripheral flange 3, to which is bolted by bolts 4, a ring 5 composed of semi-circular or segmental elements 6 and 7, to which are riveted by rivets 8, the clutch linings 9. These are rings, each composed of at least two sections separated on the line 10, which is also the dividing line for the element 5. Thus by removing bolts 4, the clutch lining bearing ring 5 may be removed in halves from between the co-operating engaging disks 12 and 13, movable under pressure toward and away from the lining bearing ring 5.

The driven shaft 14 carries splines 15 along which the disk 13 is slidable, and disk 13 carries inclined ribs or webs 16 extending from its hub to the disk and fitting within slots 17 in the hub 18 of disk 12. Accordingly, shaft 14, and the disks 12 and 13 are compelled to rotate as a unit, but the disks 12 and 13 may move longitudinally with reference to their supporting shaft, in order to engage and disengage ring 5. Motion of the disks 12 and 13 away from each other is produced by the clutch pedal 19, fast to transverse shaft 20, the bearings of which are omitted from the drawing.

Shaft 20 carries a pair of depending arms 21 which are pivotally connected to links 22 by pivot pins 23. The links 22 are pivotally connected at their inner ends with ring 24 having a running fit with the groove 25 in the hub 18 of disk 12. The ring 24 is supported against rotation by its connection with rocker arms 24'. The pivot pins connecting ring 24 with arms 24' extend into apertures in the ring 24. The lower ends of arms 24' are fixed to a transverse shaft journaled in the machine frame.

Shaft 20 also carries a cam 26 for cooperation with the curved surface 27 of an annular cam 28, carried at the end of the sleevelike hub 29 of the disk 13. When the clutch pedal is depressed, ring 24 is shifted to the left, Fig. 1, and cam 28 is moved to the right. Thus the disks 12 and 13 are forced away from each other out of gripping relation with ring 5, and against the action of restoring spring 30, which is compressed between the cam 28 and hub 18 which carry the annular seats for the spring.

In operating the clutch construction as illustrated by Figs. 1, 2 and 3, a depression of the clutch pedal results in the cam 26 engaging cam 28 and forcing disk 13 to the right out of engagement with the ring 5, and since the arms 21 rock to the left, rods 22 to which they are connected, draw the disk 12 out of engagement, both disks moving against the action of spring 30. The disks 12 and 13, having the interfitting slots and ribs 16, must rotate together, and with the driven shaft 14 to which the disk 13 is connected with splines.

Although but one specific embodiment of this invention has been herein shown and described, it will be understood that certain details of the construction shown may be altered or omitted without departing from the spirit of this invention as defined by the following claim.

I claim:

A mechanism of the class described comprising, a ring having opposite faces surfaced with brake lining material, a support for the ring, a pair of disks for engaging the brake lining ring, said disks being positioned to engage opposite surfaces of the ring and being axially movable toward and away from the ring, means for producing such axial motion of the disks, said disks having interfitting hubs, one of said hubs having a cam rigid therewith, and the other hub having an annular groove, a spring bearing between the cam on one of the hubs and the other hub, and means for forcing said cam and the disk rigid therewith in one direction, and simultaneously engaging the groove of the hub of the remaining disk and forcing said disk in the opposite direction.

JULIUS H. BACH.